UNITED STATES PATENT OFFICE.

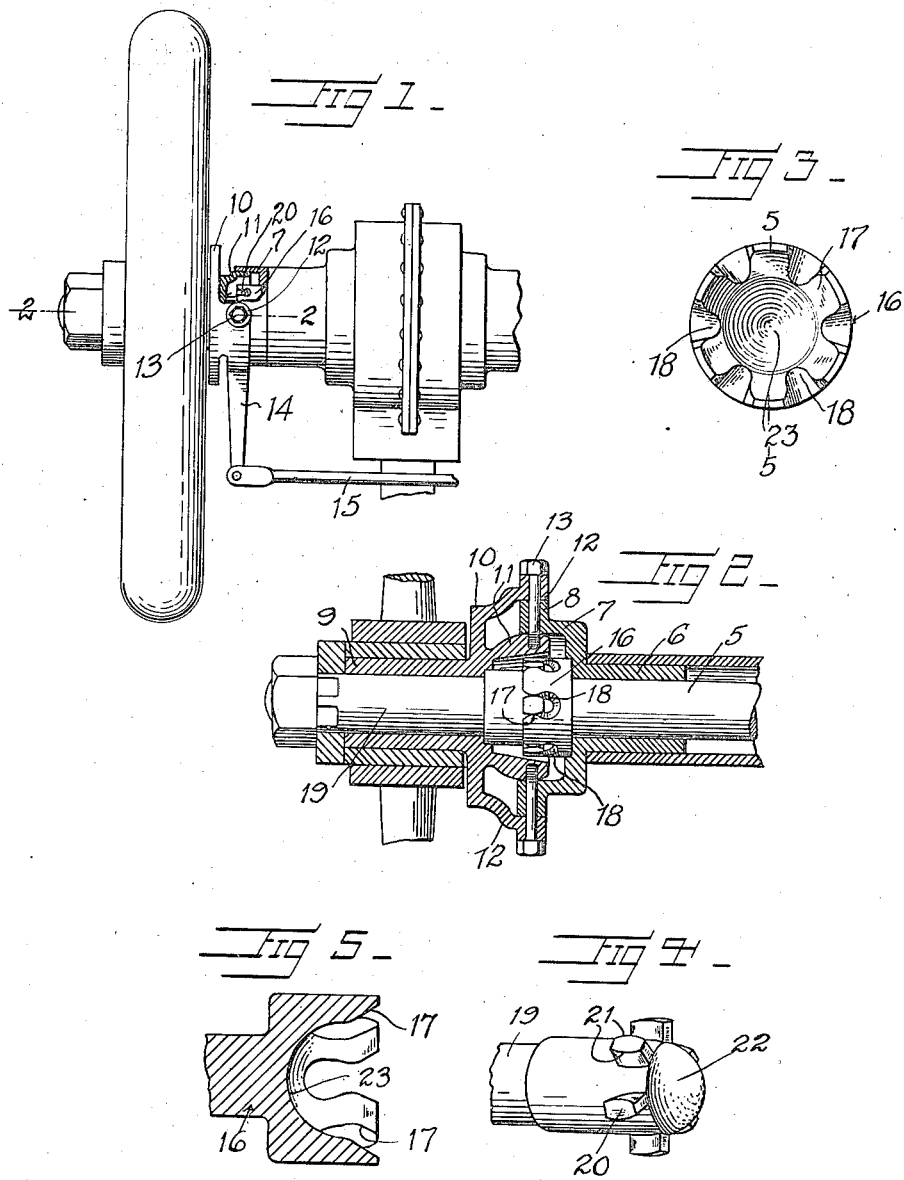

WALTER SCOTT, OF SHERIDAN, WYOMING.

UNIVERSAL JOINT.

1,277,491.

Specification of Letters Patent.   Patented Sept. 3, 1918.

Application filed May 27, 1918. Serial No. 236,759.

*To all whom it may concern:*

Be it known that I, WALTER SCOTT, a citizen of the United States, residing at Sheridan, in the county of Sheridan and State of Wyoming, have invented certain new and useful Improvements in Universal Joints, of which the following is a specification, reference being had to the accompanying drawings.

This invention relates to an improved universal joint for transmitting rotation from the driven axle to the wheel of a vehicle, and has for its primary object to provide simple, durable and efficient means for transmitting power from the driven sections of the front wheel axle to the wheel spindles, regardless of the angular relation which the spindles may assume with respect to the axle in the steering of the vehicle.

It is a more particular object of the invention to provide a device for the above purpose embodying co-engaging cogs integral with the driven axle and wheel spindle respectively and having intermeshing teeth of improved form whereby all possibility of the binding of the cog teeth with each other in the steering movements of the wheel spindle is obviated.

It is also a further general object of my invention to provide a power transmitting joint or connection as above characterized, which is very serviceable and efficient in practical operation and capable of manufacture at comparatively small cost.

With the above and other objects in view, the invention consists in the improved construction and arrangement of the several parts as will be hereinafter more fully described, subsequently claimed and illustrated in the accompanying drawing in which similar reference characters designate corresponding parts throughout the several views, and wherein:—

Figure 1 is a plan view, partly in section, illustrating the preferred embodiment of my improved universal joint;

Fig. 2 is a section taken on the line 2—2 of Fig. 1;

Fig. 3 is an end elevation of one of the power transmitting cogs or gears;

Fig. 4 is a detail perspective view of the other gear element; and

Fig. 5 is a longitudinal section taken on the line 5—5 of Fig. 3.

Referring in detail to the drawing, 5 designates the driven axle of a vehicle, which is rotatably mounted in a bearing 6 fixed in one end of the axle casing. This bearing is formed with a casing or housing 7, open at its outer side and provided at diametrically opposite points with the external bosses 8.

9 designates the hub sleeve or thimble of the wheel, which is provided upon one end with a flange 10 and a housing wall 11 projecting from one face of said flange. This wall has an outer convex surface for relative rocking engagement against the inner face of the wall of the housing 7. Upon the flange 10 at diametrically opposite points the ears 12 are integrally formed. These ears terminate in bosses which receive the bolts 13, said bolts extending through the bosses 8 on the housing 7 and having threaded engagement in the housing wall 11, as clearly seen in Fig. 2. One of the ears 12 is formed with an arm 14, to which a steering rod indicated at 15 is adapted to be connected.

Upon the end of the driven axle 5, a power transmitting gear 16 is integrally formed. In the accompanying drawing, I have shown this gear as provided with six teeth, though it will be understood that the number of teeth may vary as desired. The inner face of each tooth at its outer end is concave as at 17 and gradually reduced or tapered in thickness to the extremity of the tooth. The gear teeth at their outer ends are also relatively wide and gradually decrease in width to their inner ends, the side faces of the teeth being disposed on radial lines and describing compound curves longitudinally of the gear. The faces of the gear between the inner ends of the teeth are obliquely inclined or beveled in an outward direction from the inner to the outer sides of the teeth, as indicated at 18 in Fig. 2.

Upon the wheel spindle 19, which extends through the hub sleeve 9, equi-distantly spaced, radially disposed teeth 20 are integrally formed, said teeth corresponding in number to the number of teeth on the gear 16. These teeth gradually increase in thickness to their outer ends and have convex side faces as shown at 21. The spindle 19 terminates in a rounded or convex head 22 projecting beyond the teeth 20 and this convex terminal of the spindle is adapted for rocking engagement upon a concave seat 23 formed in the face of the gear 16 between the inner ends of the teeth thereon.

When the parts are assembled as seen in Fig. 2, the teeth 20 fit loosely between the spaced longitudinally extending teeth of the gear 16 and the convex faces 21 of the teeth 20 have rocking engagement against the side face of the adjacent gear teeth. Thus, in the relative angular movement of the wheel spindle with respect to the driven axle the teeth 20 will remain effectively meshed with the teeth of the gear 16 and there will be no break in the continuity of driving power transmitted to the vehicle wheel. By the specific construction of the power transmitting members as above disclosed a maximum of strength is obtained, while at the same time the free relative movement of the teeth 20 with respect to the teeth of the gear 16 in the steering of the vehicle wheel and their proper coaction with said teeth for the transmission of rotation to the wheel is assured. The rounded or convex terminal of the spindle 19 has free, sliding or rocking movement upon the concave seat 23, and no additional or separate bearings are necessary.

From the foregoing description, taken in connection with the accompanying drawing, the construction and several advantages of my improved joint or connection will be clearly and fully understood. The device is simple in its construction, exceedingly strong and durable, and can be manufactured and applied to automobiles and other motor driven vehicles without greatly increasing the cost thereof. It will be seen that by means of my invention, the full power is transmitted from the driven axle to the wheel in various angular positions of the wheel spindle and without necessitating any decrease in the extent of steering movement of the wheel in either direction.

While I have herein shown and described the preferred construction and arrangement of the several parts of the device, it is to be understood that the invention is susceptible of considerable modification therein and I, therefore, reserve the privilege of adopting all such legitimate changes as may be fairly embodied within the spirit and scope of the invention as claimed.

I claim:—

1. A joint connection including in combination with a main shaft having a gear integrally formed upon its end and provided with spaced longitudinally extending teeth and having a concave seat between the inner ends of the teeth, a second shaft angularly movable out of coinciding axial relation with the first named shaft and having a spherical terminal for rocking engagement upon said seat, and spaced radially projecting teeth integrally formed with the second named shaft at the inner end of the spherical terminal and engaged between the longitudinal gear teeth on the first named shaft.

2. A joint connection including in combination with a main shaft having a gear integrally formed upon its end provided with spaced longitudinally extending teeth and having a concave seat between the inner ends of the teeth, a second shaft angularly movable out of coinciding axial relation with the first named shaft and having a spherical terminal for rocking engagement upon said seat, and spaced radially projecting teeth integrally formed with the second named shaft at the inner end of the spherical terminal and engaged between the longitudinal gear teeth on the first named shaft, said radially disposed gear teeth having convex side faces for rocking engagement upon the side faces of the adjacent longitudinal gear teeth.

3. A joint connection including in combination with a main shaft having a gear integrally formed upon its end provided with spaced longitudinally extending teeth, the side faces of said gear teeth being radially disposed and outwardly curved at their ends, the inner ends of the teeth having their side faces inwardly curved and the face of the gear between the inner ends of the teeth being obliquely inclined, said gear having a concave seat formed in its face at the axial center thereof, a second shaft having a convex terminal for rocking engagement upon said seat, and spaced teeth projecting radially from said shaft at the inner end of its convex terminal and gradually increasing in thickness to their outer ends, said teeth having convex side faces for rocking engagement against the side faces of adjacent gear teeth on the first named shaft.

In testimony whereof I hereunto affix my signature in the presence of two witnesses.

WALTER SCOTT.

Witnesses:
J. J. BENTLEY,
H. E. ZULLIG.